(12) United States Patent
Uchiyama et al.

(10) Patent No.: US 10,415,797 B2
(45) Date of Patent: Sep. 17, 2019

(54) LIGHTING APPARATUS FOR DISPLAY AND SHOWCASE

(71) Applicant: STANLEY ELECTRIC CO., LTD., Tokyo (JP)

(72) Inventors: Takuro Uchiyama, Tokyo (JP); Yoshifumi Kawaguchi, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/706,340

(22) Filed: Sep. 15, 2017

(65) Prior Publication Data
US 2018/0087746 A1    Mar. 29, 2018

(30) Foreign Application Priority Data

Sep. 23, 2016  (JP) ................. 2016-185255

(51) Int. Cl.
| | | |
|---|---|---|
| F25D 27/00 | (2006.01) | |
| F21V 13/04 | (2006.01) | |
| A47F 3/00 | (2006.01) | |
| A47F 3/04 | (2006.01) | |
| F21V 5/04 | (2006.01) | |
| F21V 5/08 | (2006.01) | |
| F21V 7/00 | (2006.01) | |
| G02B 3/00 | (2006.01) | |
| F21Y 103/10 | (2016.01) | |
| F21Y 115/10 | (2016.01) | |

(Continued)

(52) U.S. Cl.
CPC .............. *F21V 13/04* (2013.01); *A47F 3/001* (2013.01); *A47F 3/0434* (2013.01); *F21V 5/04* (2013.01); *F21V 5/045* (2013.01); *F21V 5/08* (2013.01); *F21V 7/00* (2013.01); *G02B 3/00* (2013.01); *F21V 7/0091* (2013.01); *F21W 2131/305* (2013.01); *F21W 2131/405* (2013.01); *F21Y 2103/10* (2016.08); *F21Y 2115/10* (2016.08)

(58) Field of Classification Search
CPC ... F21V 5/08; F21V 13/04; F21V 5/04; F21V 5/045; F21W 2131/301; A47F 3/001; A47F 3/0434
USPC ....................................................... 362/126
See application file for complete search history.

(56) References Cited

U.S. PATENT DOCUMENTS

| | | | |
|---|---|---|---|
| 2010/0097780 A1* | 4/2010 | Beatenbough | A47F 3/001 362/92 |
| 2010/0195335 A1* | 8/2010 | Allen | F21V 5/048 362/309 |

FOREIGN PATENT DOCUMENTS

JP    2012-105691 A    6/2012

\* cited by examiner

*Primary Examiner* — Matthew J. Peerce
(74) *Attorney, Agent, or Firm* — Kenealy Vaidya LLP (57) ABSTRACT

A lighting apparatus for display includes a plurality of illumination units each including a light source that emits illumination light and a lens body, wherein the plurality of illumination units are disposed in parallel along one end of a front surface side of the display item, and the lens body has an incidence section to which illumination light enters, a reflecting surface that condenses the illumination light entering from the incidence section in a same direction by reflecting the illumination light, a first emission surface that emits the illumination light from the one end of the front surface side of the display item toward other end, and a second emission surface that emits some of the illumination light entering the reflecting surface from the one end of the front surface side of the display item to a closer side in a depth direction by allowing a transmission thereof.

18 Claims, 5 Drawing Sheets

(51) Int. Cl.
*F21W 131/305* (2006.01)
*F21W 131/405* (2006.01)

LIGHTING APPARATUS FOR DISPLAY AND SHOWCASE

CROSS-REFERENCE TO RELATED APPLICATION

Priority is claimed on Japanese Patent Application No. 2016-185255, filed Sep. 23, 2016, the content of which is incorporated herein by reference.

BACKGROUND

Field of the Invention

The present invention relates to a lighting apparatus for display and a showcase.

Description of Related Art

For example, in a refrigeration showcase, in a state in which goods (display items) such as beverage bottles or the like are placed on display racks built inside of a case main body, the goods are illuminated brightly (i.e., lighting-up) by radiating illumination light to the goods (for example, see Japanese Unexamined Patent Application, First Publication No. 2012-105691).

In addition, an opening/closing door is attached to the case main body on a front surface side via a hinge section to be freely opened and closed. A transparent window section such as a glass window or the like is installed on the opening/closing door. Accordingly, in the refrigeration showcase, goods can be seen through the window section without opening the opening/closing door.

SUMMARY

Incidentally, in the refrigeration showcase of the related art, the inside of the case main body is illuminated by disposing a plurality of light emitting diodes (LEDs) at both of left and right sides of the opening/closing door in parallel in an upward/downward direction and radiating illumination light emitted from these LEDs toward the display racks.

However, it is necessary to dispose the LEDs at both of left and right sides of the opening/closing door and to increase the number of LEDs such that a dark area is not generated inside the case main body when the inside of the case main body is illuminated. In this case, not only deterioration of lighting efficiency but also increases power consumption and cost.

An aspect of the present invention is to provide a lighting apparatus for display capable of efficiently radiating illumination light to display items, and a showcase using such a lighting apparatus for display.

An aspect of the present invention employs the following configuration.

(1) A lighting apparatus for display according to an aspect of the present invention is a lighting apparatus for display that brightly illuminates a display item by radiating illumination light to the display item, the lighting apparatus for display including: a plurality of illumination units each including a light source that emits the illumination light and a lens body disposed in front of the light source, wherein the plurality of illumination units are disposed in parallel along one end of a front surface side of the display item, and the lens body has: an incidence section to which illumination light emitted from the light source enters; a reflecting surface that condenses the illumination light entering from the incidence section by in a same direction reflecting the illumination light; a first emission surface that emits the illumination light from the one end of the front surface side of the display item toward other end; and a second emission surface that emits some of the illumination light entering the reflecting surface from the one end of the front surface side of the display item toward a closer side in a depth direction by allowing a transmission of the some of the illumination light entering the reflecting surface through the second emission surface.

(2) In the aspect of (1), the lens body may have a third emission surface that emits some of the illumination light entering the first emission surface from the one end of the front surface side of the display item toward a back side in the depth direction by refracting some of the illumination light.

(3) In the aspect of (1) or (2), the lighting apparatus for display may include a connected illumination unit in which the plurality of illumination units are connected.

(4) In the aspect of any one of (1) to (3), the light source may include a light emitting diode.

(5) A showcase according to an aspect of the present invention includes a case main body in which an accommodating space for accommodating a display item is formed; an opening/closing door attached to a front surface side of the case main body via a hinge section to be freely opened and closed, and in which a transparent window section is provided; and an illumination part that brightly illuminates the display item by radiating illumination light to the display item, wherein a lighting apparatus for display according to any one of claims 1 to 4 is used in the illumination part.

(6) In the aspect of (5), the illumination part may be disposed along a side end portion of the opening/closing door opposite to the hinge section.

(7) In the aspect of (5) or (6), the case main body may have a display rack on which the display item is placed, and a cooling mechanism that cools the accommodating space.

According to the aspects of the present invention, it is possible to provide a lighting apparatus for display capable of efficiently radiating illumination light to display items, and a showcase using the lighting apparatus for display.

DETAILED DESCRIPTION OF EMBODIMENTS

Hereinafter, an embodiment of the present invention will be described in detail with reference to the accompanying drawings.

Further, in the drawings used in the following description, in order to make components easier to see, scales of dimensions may be shown differently depending on the components, and dimensional ratios of the components are not always the same as the actual ones.

(Showcase)

Figure 1:
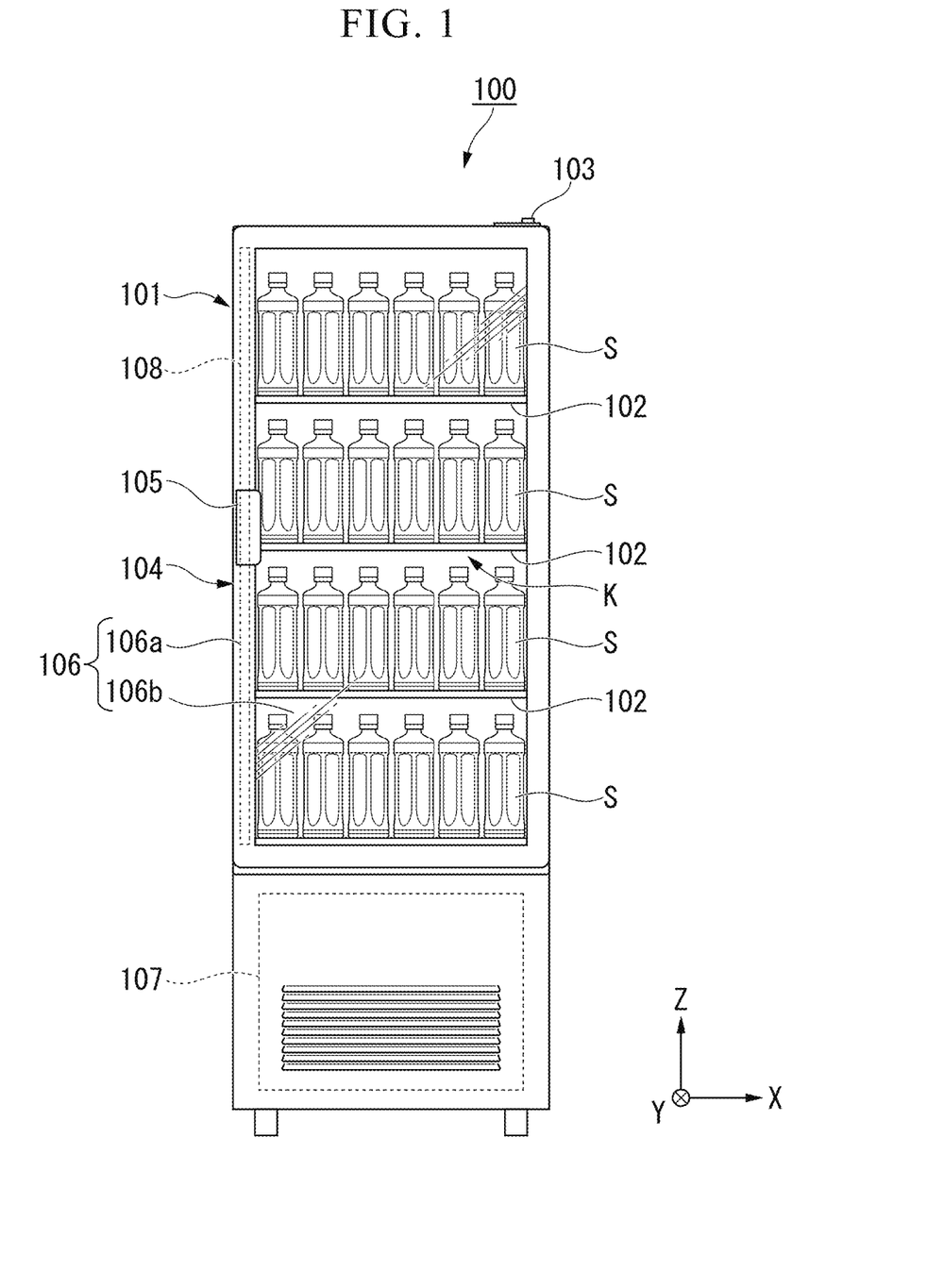
FIG. 1 is a front view showing a configuration of a refrigeration showcase according to an embodiment of the present invention.
Figure 2:
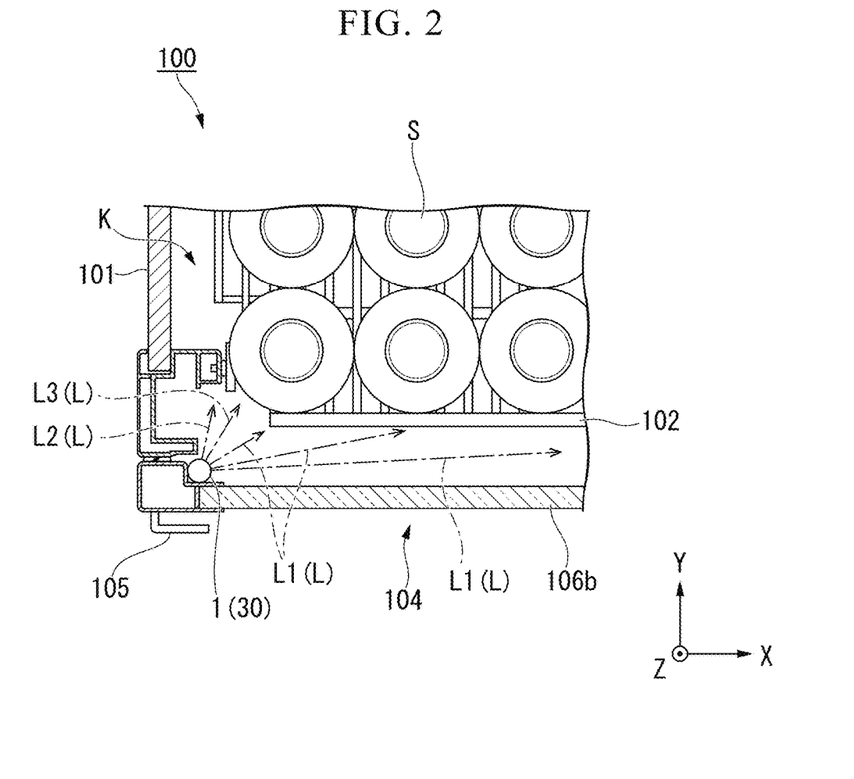
FIG. 2 is a cross-sectional view showing disposition of an illumination part of the refrigeration showcase shown in FIG. 1.

First, for example, a refrigeration showcase 100 shown in FIG. 1 will be described exemplarily as a showcase according to an embodiment of the present invention. Further, FIG. 1 is a front view showing a configuration of the refrigeration showcase 100. In addition, an XYZ orthogonal coordinate system is set in the drawings with an X-axis direction shown as a leftward/rightward direction of the refrigeration showcase 100, a Y-axis direction shown as a forward/rearward direction of the refrigeration showcase 100, and a Z-axis direction shown as an upward/downward direction of the refrigeration showcase 100.

As shown in FIG. 1, the refrigeration showcase 100 of the embodiment is a refrigerator for display disposed at a storefront of, for example, a supermarket, a convenience store, or the like. Specifically, the refrigeration showcase 100 includes a case main body 101 in which an accommodating space K configured to accommodate goods (display items) S such as beverage bottles or the like is formed.

The case main body 101 is formed in a rectangular parallelepiped shape as a whole. Display racks 102 on which goods S are placed are built in the accommodating space K of the case main body 101. The display racks 102 are disposed in a plurality of stages in the upward/downward direction.

An opening/closing door 104 is attached to the case main body 101 on a front surface side via a hinge section 103 to be freely opened and closed. The hinge section 103 supports the opening/closing door 104 to freely pivot about a pivot shaft along a side surface of one side (a right side of FIG. 1) of the opening/closing door 104. In addition, a knob 105 configured to easily open and close the opening/closing door 104 is attached to a front surface of the opening/closing door 104 opposite to the hinge section 103 (a left side of FIG. 1).

A transparent window section 106 through which the goods S displayed on the display racks 102 can be seen is installed on the opening/closing door 104. The window section 106 is formed in a rectangular window frame 106a that surrounds the opening/closing door 104 by fitting a transparent plate member 106b such as a glass plate or the like into the window frame 106a.

Further, in the opening/closing door 104, an insulating property of the window section 106 can be increased by using multi-layered glass as a plate member 106b or affixing an insulating film to the plate member 106b.

While not shown, both side surfaces, a back surface and an upper surface of the case main body 101 are surrounded by a wall section having an insulating property. Meanwhile, in order for the goods S displayed on the display racks 102 to be visible, like the above-mentioned opening/closing door 104, both side surfaces and the back surface of the case main body 101 may be constituted by a transparent plate member such as a glass plate or the like. Further, a configuration in which an opening/closing door able to be freely opened and closed and through which the goods S can be supplemented or replaced may be attached to the back surface of the case main body 101.

A cooling mechanism 107 configured to cool the accommodating space K is installed in a lower section of the case main body 101. The cooling mechanism 107 adjusts a temperature in the case main body 101 such that the inside of the case main body 101 (the accommodating space K) is at a constant temperature (for example, in JIS, within a range of 0 to 10° C. in a room temperature of 15 to 30° C.).

An illumination part 108 configured to illuminate the goods S by radiating illumination light to the goods S displayed on the display racks 102 is installed on the case main body 101. An illumination part 108 is disposed along a side end portion of the opening/closing door 104 opposite to the hinge section 103 (a left side of FIG. 1). In addition, a lighting apparatus for display to which the present invention is applied is used in the illumination part 108.

(Lighting Apparatus for Display)

Figure 3:
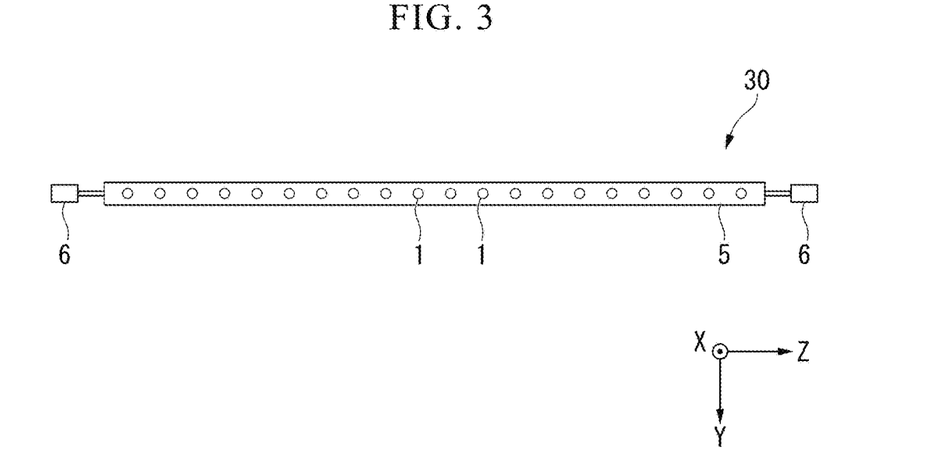
FIG. 3 is a plan view showing a connected illumination unit that constitutes the illumination part shown in FIG. 2.
Figure 4:
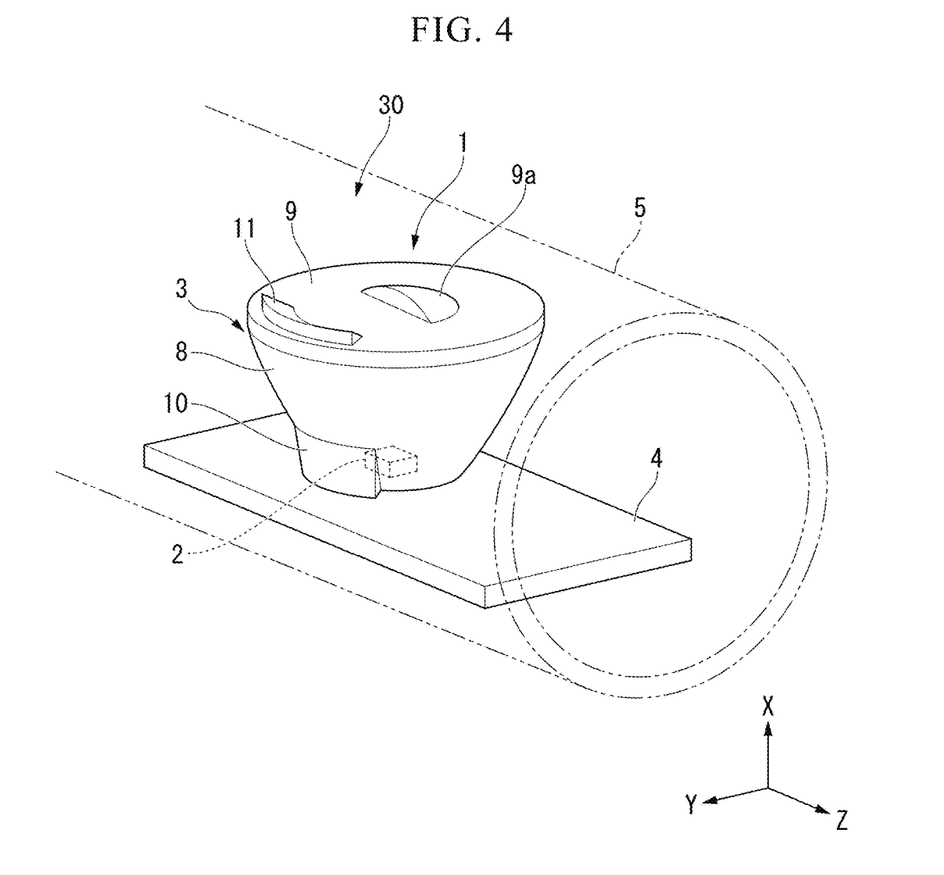
FIG. 4 is a perspective view showing an illumination unit that constitutes the connected illumination unit shown in FIG. 3.
Figure 5A:
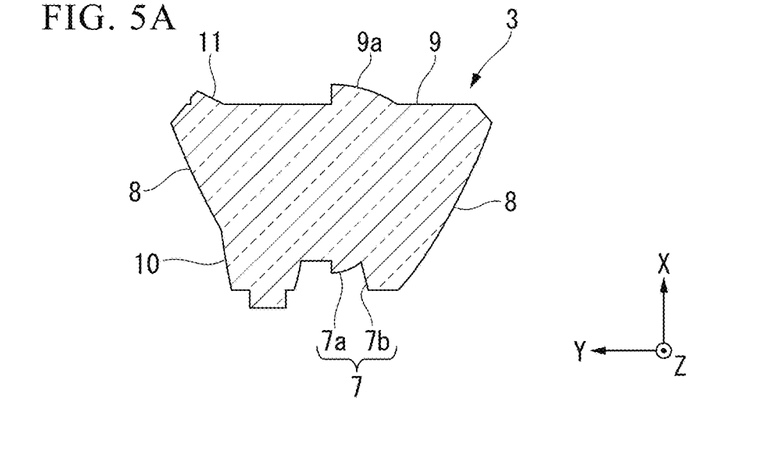
FIG. 5A is a cross-sectional view of the illumination unit shown in FIG. 4.
Figure 5B:
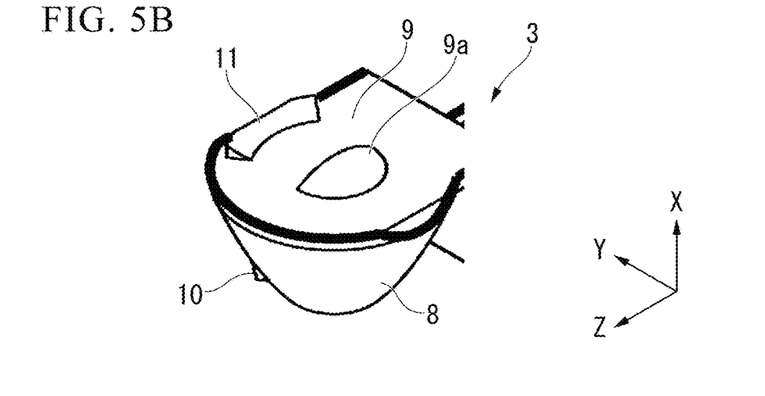
FIG. 5B is a perspective view of the illumination unit shown in FIG. 4 from one side.
Figure 5C:
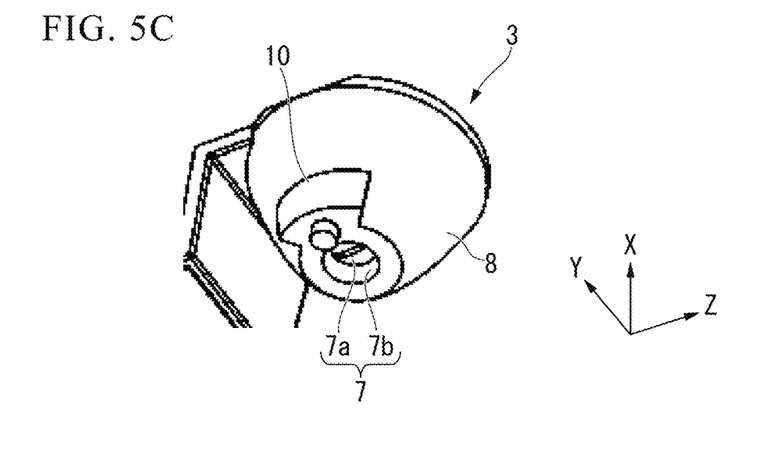
FIG. 5C is a perspective view of the illumination unit shown in FIG. 4 from the other side.
Figure 6:
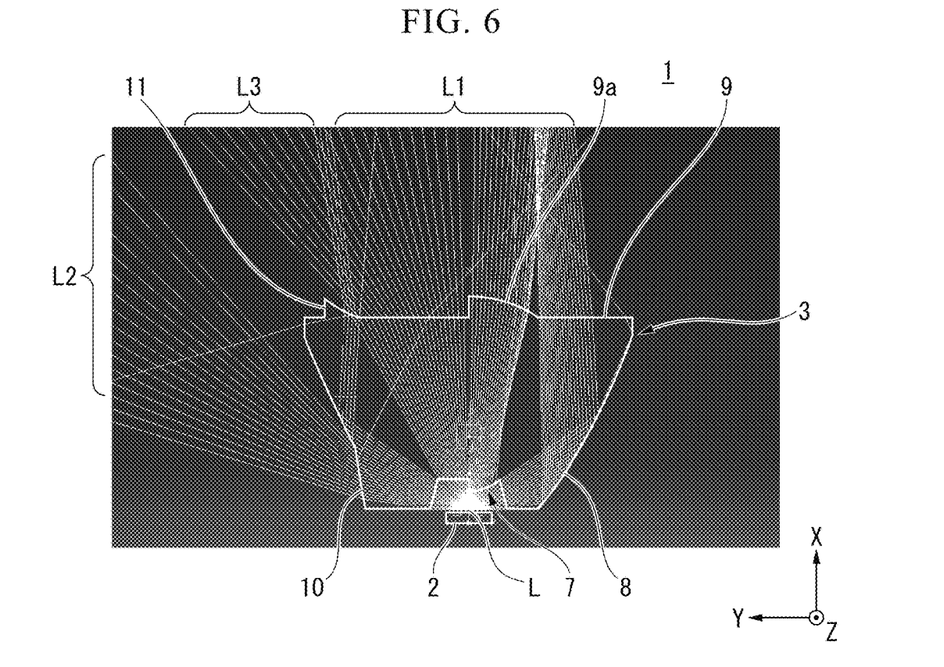
FIG. 6 is a light path diagram showing a light path of illumination light emitted from a light source of the illumination unit shown in FIGS. 5A to 5C.
Figure 7:
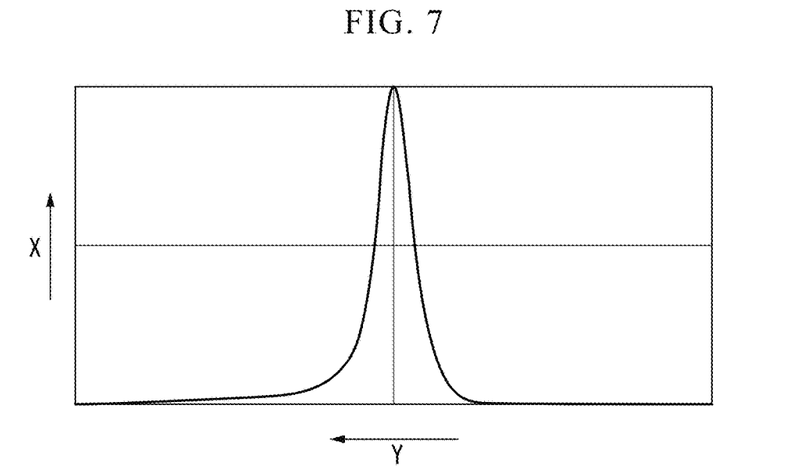
FIG. 7 is a graph showing a light distribution curve in an XY cross section of the illumination unit shown in FIGS. 5A to 5C.

Next, the lighting apparatus for display used in the illumination part 108 of the refrigeration showcase 100 will be described with reference to FIG. 3 to FIG. 7. Further, FIG. 3 is a plan view showing a connected illumination unit 30 that constitutes the illumination part 108. FIG. 4 is a perspective view showing an illumination unit 1 that constitutes the connected illumination unit 30. FIG. 5A is a cross-sectional view showing a configuration of the illumination unit 1, FIG. 5B is a perspective view showing the illumination unit 1 from one side, and FIG. 5C is a perspective view showing the illumination unit 1 from the other side. FIG. 6 is a light path diagram showing a light path of illumination light L emitted from a light source 2 of the illumination unit 1. FIG. 7 is a graph showing a light distribution curve of the illumination unit 1.

As shown in FIG. 3 and FIG. 4, the lighting apparatus for display of the embodiment includes the connected illumination unit 30 in which the plurality of illumination units 1 are connected. In addition, each of the illumination units 1 includes the light source 2 configured to emit illumination light L, and a lens body 3 disposed in front of the light source 2.

A light emitting element such as a light emitting diode (LED), an organic EL (OLED), or the like, may be used as the light source 2. Further, in the embodiment, a white LED configured to emit white light is used.

For example, a material having a refractive index higher than that of a transparent resin, glass, or the like, such as polycarbonate, acrylic (PMMA), or the like may be used in the lens body 3. In addition, when the transparent resin is used in the lens body 3, the lens body 3 can be formed by injection molding using a mold. Further, in the embodiment, PMMA is used.

The connected illumination unit 30 has a flexible printed wiring circuit (FPC) 4 having an elongated belt shape, and a transparent cylindrical tube 5. The plurality of illumination units 1 are mounted on a surface of the FPC 4 in a longitudinal direction at equal intervals. In addition, a wiring (not shown) electrically connected to the light source 2 of the illumination units 1 and a wiring connector 6 electrically connected to an external power supply are installed at both ends of the FPC 4. The tube 5 protects the plurality of illumination units 1 and the FPC 4 by accommodating the FPC 4, in which the plurality of illumination units 1 are mounted, in the tube 5. In addition, depending on a curved shape of the tube 5, it is also possible to provide a condensing function in front of the lens body 3.

The connected illumination unit 30 is attached to the window frame 106a of the opening/closing door 104 opposite to the hinge section 103 (a left side of FIG. 1) in a linear shape in the upward/downward direction. Accordingly, the plurality of illumination units 1 serving as the illumination part 108 of the refrigeration showcase 100 radiate the illumination light L toward front surfaces of the goods S displayed on the display racks 102.

In the illumination unit 1 of the embodiment, light distribution of the illumination light L emitted from the light source 2 is controlled by the lens body 3 such that the illumination light L is efficiently radiated toward front surfaces of the goods S displayed on the display racks 102.

Specifically, as shown in FIGS. 5A to 5C and FIG. 6, the lens body 3 has an incidence section 7 to which the illumination light L emitted from the light source 2 enters, a reflecting surface 8 configured to reflect the illumination light L that enters from the incidence section 7, and a first emission surface 9, a second emission surface 10 and a third emission surface 11 that are configured to emit the illumination light L.

The incidence section 7 has a first condensing incidence surface 7a and a second condensing incidence surface 7b formed at positions facing the light source 2. The first condensing incidence surface 7a is constituted by a freeform-surface (non-spherical surface)-shaped convex surface protruding rearward from a central section thereof. The second condensing incidence surface 7b is constituted by a substantially cylindrical inner circumferential surface of a portion protruding rearward from a position surrounding the first condensing incidence surface 7a.

The light source 2 radially emits the illumination light L forward (in a +X-axis direction). In the incidence section 7, the illumination light L entering from the first condensing incidence surface 7a among the illumination light L entering from the light source 2 is condensed toward the first emission surface 9. Meanwhile, the illumination light L entering from the second condensing incidence surface 7b is condensed toward the reflecting surface 8.

Further, in the white LED used in the light source 2, due to its characteristics, a center of an element is white and a periphery of the element emits yellow, and color separation easily occurs when light is converted by the lens body 3. Therefore, in order to reduce the color separation of the illumination light L emitted from the light source 2, it is preferable to perform an emboss processing on a surface of the incidence section 7.

The reflecting surface 8 is constituted by an outer circumferential surface formed to be curved to draw a parabola of a portion protruding forward from a position surrounding the incidence section 7. The reflecting surface 8 condenses the illumination light L entering from the second condensing incidence surface 7b toward the first emission surface 9 in the same direction as that of the illumination light L entering from the first condensing incidence surface 7a by reflecting the illumination light L.

The first emission surface 9 emits illumination light (hereinafter referred to as first illumination light) L1, condensed toward the first emission surface 9, forward (in the +X-axis direction). In addition, a refracting interface 9a configured to adjust light distribution of the first illumination light L1 emitted from the first emission surface 9 is installed on the first emission surface 9.

Accordingly, the first illumination light L1 emitted from the first emission surface 9 is radiated from one end (the left end of FIG. 1) of front surface sides of the goods S displayed on the display racks 102 to the other end (the right end in FIG. 1).

The second emission surface 10 is constituted by a cylindrical surface disposed in the vicinity of a rear side of the reflecting surface 8 that faces a back surface of the case main body 101. The second emission surface 10 allows transmission of illumination light (hereinafter referred to as second illumination light) L2 entering the second emission surface 10. Accordingly, the second illumination light L2 emitted from the second emission surface 10 is radiated from one end (the left end in FIG. 1) of front surface sides of the goods S displayed on the display racks 102 toward a closer side in a depth direction (a +Y-axis direction).

The third emission surface 11 is constituted by a prism surface disposed in the vicinity of an end portion of the first emission surface 9 facing the back surface of the case main body 101. The third emission surface 11 refracts illumination light (hereinafter referred to as third illumination light) L3 entering the third emission surface 11. Accordingly, the third illumination light L3 emitted from the third emission surface 11 is radiated from one end (the left end in FIG. 1) of front surface sides of the goods S displayed on the display racks 102 to a back side of the depth direction (the +Y-axis direction). Further, the third emission surface 11 may be omitted depending on circumstances.

A light distribution curve in an X-Y cross section of the illumination unit 1 in which light distribution of the illumination light L is adjusted by the above mentioned lens body 3 is shown in FIG. 7. As shown in FIG. 7, the illumination light L emitted from the illumination unit 1 has asymmetrical light distribution with respect to an optical axis of the illumination light L because the second illumination light L2 and the third illumination light L3 radiated from one end of front surface sides of the goods S in the depth direction (the +Y-axis direction) are included separately from the first illumination light L1 radiated from one end of front surface sides of the goods S toward the other end (the +X-axis direction).

Accordingly, in the refrigeration showcase 100 of the embodiment, the illumination light L can be efficiently radiated to the front surface sides of the goods S displayed on the display racks 102 by the plurality of illumination units 1 (the connected illumination unit 30) in which light distribution of the illumination light L is adjusted by the lens body 3.

That is, when the illumination light L is radiated from the illumination part 108 (the illumination unit 1) disposed at one end side of the opening/closing door 104 toward front surface sides of the goods S displayed on the display racks 102, one end side of the display rack 102 is relatively darkened by merely radiating the first illumination light L1 that is radiated as described above.

On the other hand, the front surface sides of the goods S displayed on the display racks 102 can be illuminated by radiating the above mentioned second illumination light L2 and the third illumination light L3 without generating a dark area.

In addition, in the refrigeration showcase 100 of the embodiment, the illumination light L can be efficiently radiated to the front surface sides of the goods S displayed on the display racks 102 by the illumination part 108 disposed at one end side of the opening/closing door 104. Accordingly, it is unnecessary to dispose the illumination part 108 on both of the left and right sides of the opening/closing door 104 as in the related art, and the number of the light sources 2 necessary to brightly illuminate the front surface sides of the goods S can be greatly decreased compared to the related art. As a result, it is possible to reduce power consumption and cost compared to the related art.

Further, the back surface (deep inside) side in the refrigeration showcase 100 of the embodiment is relatively darkened since the illumination part 108 brightly illuminates a front surface side (a near side) in the case main body 101. Meanwhile, in the goods S displayed on the display racks 102, only the goods S disposed on a front row (a near side) is required to be brightly illuminated. Accordingly, in the refrigeration showcase 100 of the embodiment, the illumination light L can be more efficiently radiated to the goods S displayed on the display racks 102 than in the case in which the illumination light L is radiated to the entire inside of the case main body 101.

In addition, in the refrigeration showcase 100 of the embodiment, the illumination part 108 is disposed at an opposite side of the hinge section 103 of the opening/closing door 104, i.e., the knob 105 side. In this case, since the illumination part 108 does not come into the observer's sight when the opening/closing door 104 is opened, it is possible to prevent the observer feeling a dazzling of the illumination part 108.

In addition, in the refrigeration showcase 100 of the embodiment, the plurality of illumination units 1 are collectively disposed at one end side inside the case main body 101, in which the illumination part 108 is disposed (the left side in FIG. 1). In this case, as peripheral portions of the illumination units 1 are in white, the goods S displayed on the display racks 102 can be illuminated brightly by the illumination light L reflected by the peripheral portions.

Further, the present invention is not limited to the embodiment, and various modifications may be made without departing from the scope of the present invention.

For example, in the embodiment, while the refrigeration showcase 100 is exemplified as the showcase to which the present invention is applied, there is no limitation thereto and the present invention may be widely applied to a freezing showcase, a heating and warming showcase, a general showcase, or the like.

In addition, the lighting apparatus for display to which the present invention is applied is not limited to the case of the illumination part of the above-mentioned showcase, and the present invention may be widely applied to display items to which the lighting apparatus for display can be applied. In this case, the illumination units 1 (the connected illumination units 30) may be disposed along any one end portion (one end) in the upward/downward direction or may be disposed along two end portions or more when display items are seen from front surface sides thereof.

EXAMPLE

Hereinafter, effects of the present invention will be made more apparent with reference to an example. Further, the present invention is not limited to the following example, and appropriate modifications may be made without departing from the scope of the present invention.

In the example, the inside of the case main body 101 was illuminated using the connected illumination unit 30 in the illumination part 108 of the actual refrigeration showcase 100. Then, in a state in which an illuminance meter was directed toward the window section 106 of the opening/closing door 104, measurement of illuminance (lx) was performed at nine places of "left, center, right" and "upper, middle, low." The measurement results are represented in Table 1.

Further, since the connected illumination unit 30 should be attached to the window frame 106a, a size of the connected illumination unit 30 is limited, and an outer diameter of the tube 5 should be about 18 mm or less. In addition, a condensing lens 3 has a size that can be accommodated in the tube 5 (an inner diameter of 16 mm). An output of the white LED is 24 W. In addition, the illumination unit 1 was designed such that a ½ beam angle of a light distribution curve in an XY cross section is 12°. Further, even when emboss processing is performed on the incidence section 7, a ½ beam angle of a light distribution curve in an XY cross section is preferably 30°.

TABLE 1

| Measurement Positions | Left | Center | Right |
|---|---|---|---|
| Upper | 630 | 145 | 212 |
| Middle | 678 | 229 | 405 |
| Low | 595 | 146 | 262 |
| Average | | 367 | |

As represented in Table 1, sufficient illuminance was obtained at the above-mentioned nine positions. In addition, even when considering an average of the nine positions, 350 lx or more, which is a required quality, is guaranteed. Further, it is also confirmed that the emboss processing is effective for reducing the color separation.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A lighting apparatus for display that brightly illuminates a display item by radiating illumination light to the display item, the lighting apparatus for display comprising:
a plurality of illumination units each including a light source that emits the illumination light and a lens body disposed in front of the light source,
wherein the plurality of illumination units are disposed in parallel along one end of a front surface side of the display item, and
the lens body has:
an incidence section to which illumination light emitted from the light source enters;
a reflecting surface that condenses the illumination light entering from the incidence section in a same direction by reflecting the illumination light;
a first emission surface that emits the illumination light from the one end of the front surface side of the display item toward other end; and
a second emission surface that emits the illumination light from the one end of the front surface side of the display item toward a closer side in a depth direction,
the incidence section includes a first condensing incidence surface disposed at a position facing the light source and a second condensing incidence surface that is constituted by an inner circumferential surface protruding rearward from a position surrounding the first condensing incidence surface,
the first emission surface is provided at a position facing the first condensing incidence surface, and
the second emission surface is provided at a position facing the second condensing incidence surface and is partially formed at a rearward position of the reflecting surface.

2. The lighting apparatus for display according to claim 1, wherein the lens body has a third emission surface that is formed at an end portion of the first emission surface and that is constituted by a prism surface which refracts the illumination light outward with respect to an optical axis.

3. The lighting apparatus for display according to claim 1, comprising a connected illumination unit in which the plurality of illumination units are connected.

4. The lighting apparatus for display according to claim 1, wherein the light source comprises a light emitting diode.

5. A showcase comprising:
a case main body in which an accommodating space for accommodating a display item is formed;
an opening and closing door attached to a front surface side of the case main body via a hinge section to be freely opened and closed, and in which a transparent window section is provided; and
an illumination part that brightly illuminates the display item by radiating illumination light to the display item,
wherein a lighting apparatus for display according to claim 1 is used in the illumination part, and
the second emission surface is arranged so as to face a back surface of the case main body.

6. The showcase according to claim 5, wherein the illumination part is disposed along a side end portion of the opening/closing door opposite to the hinge section.

7. The showcase according to claim 5, wherein the case main body has a display rack on which the display item is placed, and a cooling mechanism that cools the accommodating space.

8. The lighting apparatus for display according to claim 1, wherein, in a cross section passing an optical axis of the illumination light emitted from the light source, the reflecting surface is disposed at one side and the second emission surface is disposed at an other side of positions opposing the second condensing incidence surface on an outer circumferential surface of the lens body, and
the illumination light from the illumination unit has asymmetrical light distribution about an optical axis of the illumination light.

9. The lighting apparatus for display according to claim 8, wherein the incidence section is formed at a position facing the light source and has a first condensing incidence surface that is constituted with a convex surface protruding rearward, and
the first condensing incidence surface condenses the entered illumination light toward the first emission surface.

10. The lighting apparatus for display according to claim 8, wherein the incidence section is formed at a position facing the light source and has a second condensing incidence surface that is constituted by a cylindrical inner circumferential surface protruding rearward from a position surrounding the first condensing incidence surface, and
the second condensing incidence surface condenses the entered illumination light toward the reflecting surface.

11. The showcase according to claim 5, wherein, in a cross section passing an optical axis of the illumination light emitted from the light source, the reflecting surface is disposed at one side and the second emission surface is disposed at an other side of positions opposing the second condensing incidence surface on an outer circumferential surface of the lens body, and
the illumination light from the illumination unit has asymmetrical light distribution about an optical axis of the illumination light.

12. The showcase according to claim 11, wherein the incidence section is formed at a position facing the light source and has a first condensing incidence surface that is constituted with a convex surface protruding rearward, and
the first condensing incidence surface condenses the entered illumination light toward the first emission surface.

13. The showcase according to claim 11, wherein the incidence section is formed at a position facing the light source and has a second condensing incidence surface that is constituted by a cylindrical inner circumferential surface protruding rearward from a position surrounding the first condensing incidence surface, and
the second condensing incidence surface condenses the entered illumination light toward the reflecting surface.

14. The showcase according to claim 5, wherein the case main body includes a plurality of display racks on which the display item is placed at a front side of the case main body in the accommodating space.

15. The showcase according to claim 11, wherein the case main body includes a plurality of display racks on which the display item is placed at a front side of the case main body in the accommodating space.

16. The showcase according to claim 5, wherein the end portion where the third emission surface is formed is disposed at a side that faces with the back surface of the case main body.

17. The showcase according to claim 16, wherein the case main body includes a plurality of display racks on which the display item is placed at a front side of the case main body in the accommodating space.

18. The showcase according to claim 16, wherein, in a cross section passing an optical axis of the illumination light emitted from the light source, the reflecting surface is disposed at one side and the second emission surface is disposed at an other side of positions opposing the second condensing incidence surface on an outer circumferential surface of the lens body, and
the illumination light from the illumination unit has asymmetrical light distribution about an optical axis of the illumination light.

* * * * *